(12) United States Patent
Gao et al.

(10) Patent No.: US 6,970,553 B1
(45) Date of Patent: Nov. 29, 2005

(54) INTEGRATED CHAT CLIENT WITH CALLING PARTY CHOICE

(75) Inventors: Xiaofeng Gao, Alpharetta, GA (US); David Scott, Norcross, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 449 days.

(21) Appl. No.: 10/159,314

(22) Filed: May 30, 2002

(51) Int. Cl.$^7$ ............................................. H04M 3/00
(52) U.S. Cl. ............................. 379/265.09; 379/90.01; 379/900
(58) Field of Search .................... 379/88.17, 114.01, 379/201.01, 88.18, 90.01, 93.09, 202.01, 379/221.08, 265.09, 900; 370/260, 352; 709/204

(56) References Cited

U.S. PATENT DOCUMENTS

| | | | |
|---|---|---|---|
| 5,483,588 A | 1/1996 | Eaton et al. ................ | 379/202 |
| 5,572,582 A | 11/1996 | Riddle ......................... | 379/202 |
| 5,805,587 A | 9/1998 | Norris et al. ............... | 370/352 |
| 5,809,128 A | 9/1998 | McMullin ................... | 379/215 |
| 6,078,581 A | 6/2000 | Shtivelman et al. ........ | 370/352 |
| 6,141,413 A | 10/2000 | Waldner et al. ............. | 379/265 |
| 6,272,214 B1 | 8/2001 | Jonsson ...................... | 379/202 |
| 6,275,575 B1 | 8/2001 | Wu ....................... | 379/202.01 |
| 6,320,857 B1 | 11/2001 | Tonnby et al. .............. | 370/352 |
| 6,345,047 B1 | 2/2002 | Regnier ...................... | 370/352 |
| 6,366,661 B1 | 4/2002 | Devillier et al. ....... | 379/211.01 |
| 6,463,131 B1 | 10/2002 | French-St.George et al. ......................... | 379/88.23 |
| 6,603,840 B2 | 8/2003 | Fellingham et al. ..... | 379/93.23 |
| 6,661,785 B1 | 12/2003 | Zhang et al. ............... | 370/352 |
| 6,677,976 B2 | 1/2004 | Parker et al. ............ | 348/14.08 |
| 6,690,654 B2 * | 2/2004 | Elliott et al. ................ | 370/260 |
| 6,724,871 B2 | 4/2004 | Maytal ..................... | 379/93.08 |
| 6,757,732 B1 | 6/2004 | Sollee et al. ................ | 709/227 |
| 2003/0005076 A1 * | 1/2003 | Koch et al. ................. | 709/217 |
| 2003/0006194 A1 | 1/2003 | Williams et al. | |
| 2003/0026402 A1 | 2/2003 | Clapper | |
| 2003/0043787 A1 | 3/2003 | Emerson, III | |
| 2003/0112930 A1 | 6/2003 | Bosik et al. | |
| 2003/0112931 A1 * | 6/2003 | Brown et al. ............ | 379/93.23 |
| 2003/0133548 A1 * | 7/2003 | Lee et al. ................ | 379/93.17 |
| 2003/0185360 A1 * | 10/2003 | Moore et al. .......... | 379/114.01 |
| 2004/0086100 A1 * | 5/2004 | Moore et al. .......... | 379/201.01 |

OTHER PUBLICATIONS

"Instant Messaging" notation made on Information Disclosure Statement submitted in conjunction with this document.
U.S. Appl. No. 10/159,377, filed May 30, 2002, Integrated Chat Client with Called Party Choice.
U.S. Appl. 10/159,306, filed May 30, 2002, DSL Integrated Call Waiting.

* cited by examiner

*Primary Examiner*—Bing Q. Bui
(74) *Attorney, Agent, or Firm*—Thomas, Kayden, Horstemeyer & Risley

(57) ABSTRACT

Phone systems for an integrated chat client service are provided. A representative phone system includes call processing system operable to check whether a called party has a called party chat client accessible through a chat server coupled to the internet. The call processing system is further operable to prompt a calling party to select to talk or chat with the called party when the called party chat client is accessible. Methods to connect and place telephone calls are also provided.

51 Claims, 7 Drawing Sheets

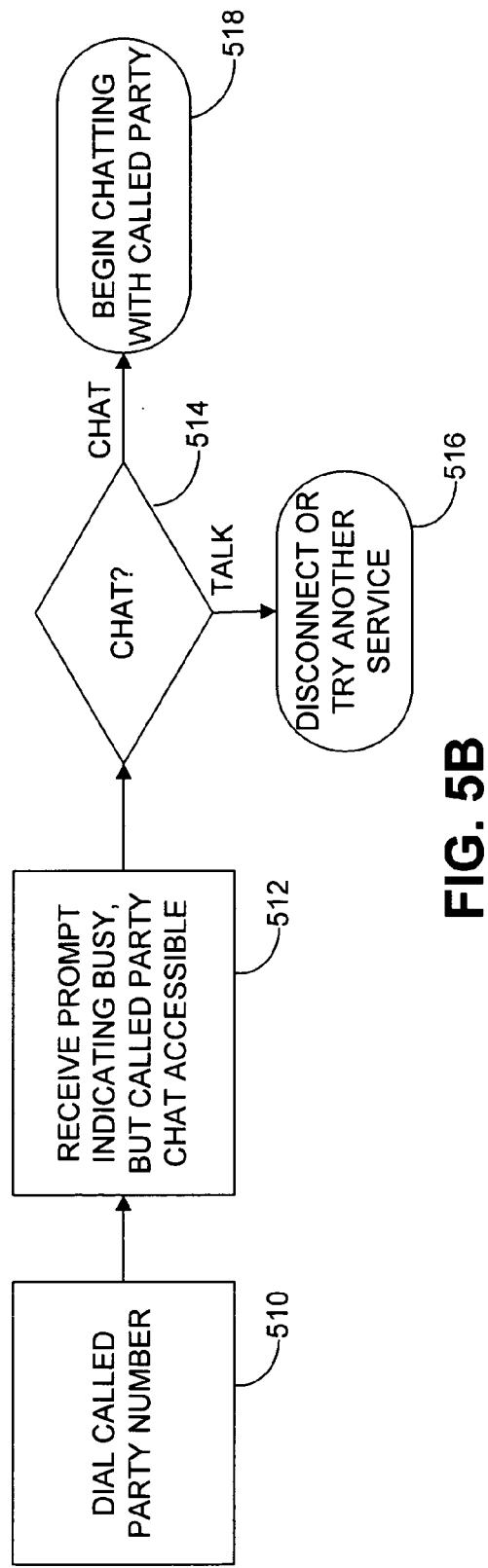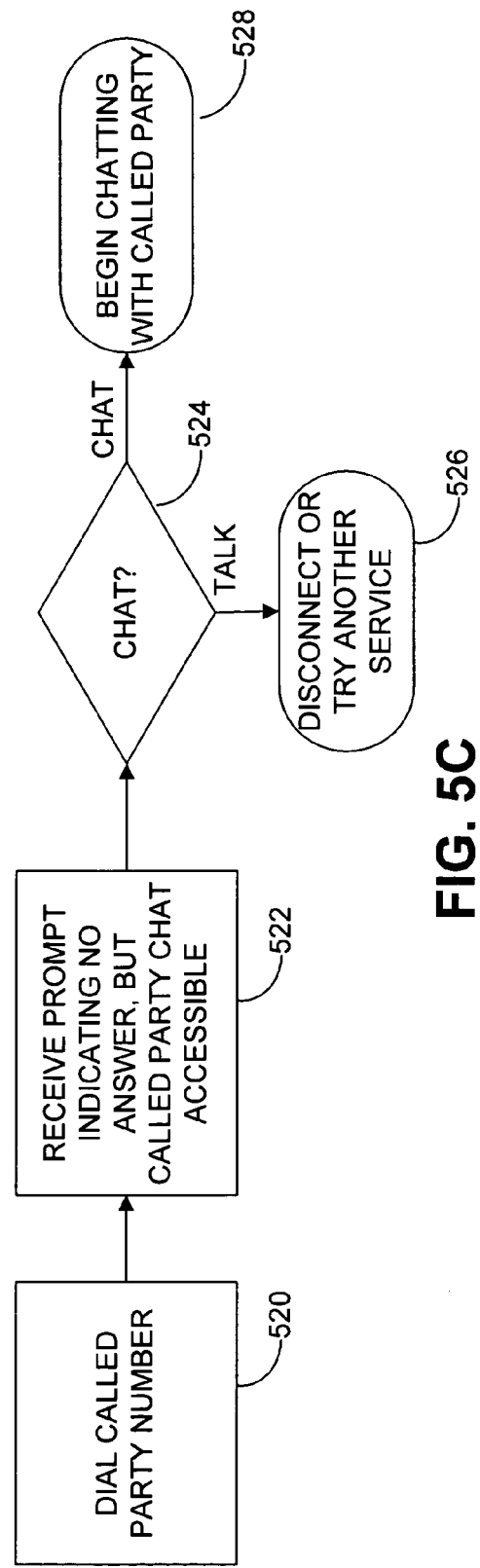

INTEGRATED CHAT CLIENT WITH CALLING PARTY CHOICE

FIELD OF THE INVENTION

The present invention is generally related to telecommunications and more particularly to the integration of telephone systems and internet applications.

DESCRIPTION OF THE RELATED ART

The telecommunications industry has undergone rapid changes in the past several years. With the development of the advanced intelligent network (AIN), telephone companies are poised to offer a multitude of new services to subscribers. Typically, AINs provide a more flexible handling of telephone calls. This flexibility is provided by a complex packet-switched network which allows for high speed communication and high volume traffic. One example of an AIN is further described in U.S. Pat. No. 5,701,301 and U.S. Pat. No. 5,838,774, each of which is hereby incorporated by reference.

AIN embodiments in the United States use a signaling system 7 (SS7) protocol to transport messages. Instead of circuit switching, the AIN relies on soft switching to provide high speed routing for telephone calls. The AIN comprises service switching points (SSPs), service nodes (SNs), signal transfer points (STPs), and service control points (SCPs). An SSP is typically an AIN-compatible switching office. The SN is a smart termination device that assesses incoming call information and make appropriate connections. The SSPs are connected by a number of STPs which transfer data among the SSPs and between the SSPs and SCPs. The STPs can generally be described as the routers which read the packet and transfer it to the called party SSP. Finally, the SCP is typically a fault tolerant computer that is coupled to a central database. This central database comprises a host of subscriber and routing information.

For better understanding a call routing sequence on an SS7 network will now be described. Typically, when a call is placed a calling party dials a telephone number and an SSP receives the place call request and routes it to the proper SSP associated with the called party. When the called party SSP receives the call request, it causes a trigger to fire. This trigger then causes the SSP to send a query across the STPs to an SCP. The query typically comprises asking the SCP how the call should be handled, such as specific subscriber instructions and any other specific routing information that is necessary. After receiving handling information from the SCP, the SSP uses these instructions to create a packet to send across the STPs to the called party SSP. The called party SSP then triggers and asks the SCP for subscriber-specific handling information for the called party. Typically the SCP will merely instruct the SSP to connect the call, however, the called party may have special instructions for incoming calls.

As was noted above, the AIN allows for subscriber-specific handling instructions. However, there presently is no mechanism by which a called party can keep his/her side of the conversation private from others who may be present in the room. Therefore, there is a need for systems and methods that address these and/or other perceived shortcomings of the prior art.

SUMMARY OF THE INVENTION

One embodiment, among others, of the present invention provides systems and methods for an integrated chat client having a called party choice. A representative system includes a call processing system operable to check whether a called party has a called party chat client accessible through a chat server coupled to the internet. The call processing system is further operable to prompt a calling party to select to talk or chat with the called party when the called party chat client is accessible.

An example method to connect phone calls includes: receiving a call request; checking for accessibility of a called party chat client associated with a called party; and prompting a calling party to choose whether or not to chat with the called party when the called party chat client is accessible.

An example method for placing phone calls is provided, whereby the method includes: dialing a specific feature code trigger; dialing a called party telephone number associated with a called party; selecting chat when a called party chat client is accessible; and initiating a chat session when the calling party selects chat.

An alternative example method for placing phone calls is provided, whereby the method includes: dialing a called party telephone number associated with a called party; receiving a prompt indicating the called party telephone number is busy, and a called party chat client is accessible; and selecting chat when a called party chat client is accessible.

A further alternative example method for placing a phone call is provided, whereby the method includes: dialing a called party telephone number associated with a called party; receiving a prompt indicating no answer at the called party telephone number, and a called party chat client is accessible; and selecting chat when a called party chat client is accessible.

Other systems, methods, features, and advantages of the present invention will be or become apparent to one with skill in the art upon examination of the following drawings and detailed description. It is intended that all such additional systems, methods, features, and advantages included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 5B is a flowchart illustrating a method, among others, of using the integrated chat client shown in FIG. 1.

FIG. 5C is a flowchart illustrating a method, among others, of using the integrated chat client shown in FIG. 1.

DETAILED DESCRIPTION OF THE PREFERRED EMBODIMENTS

The invention now will be described more fully with reference to the accompanying drawings. The invention may, however, be embodied in many different forms and should not be construed as limited to the embodiments set forth 5 herein; rather, these embodiments are intended to convey the scope of the invention to those skilled in the art. Furthermore, all "examples" given herein are intended to be non-limiting.

Figure 1:
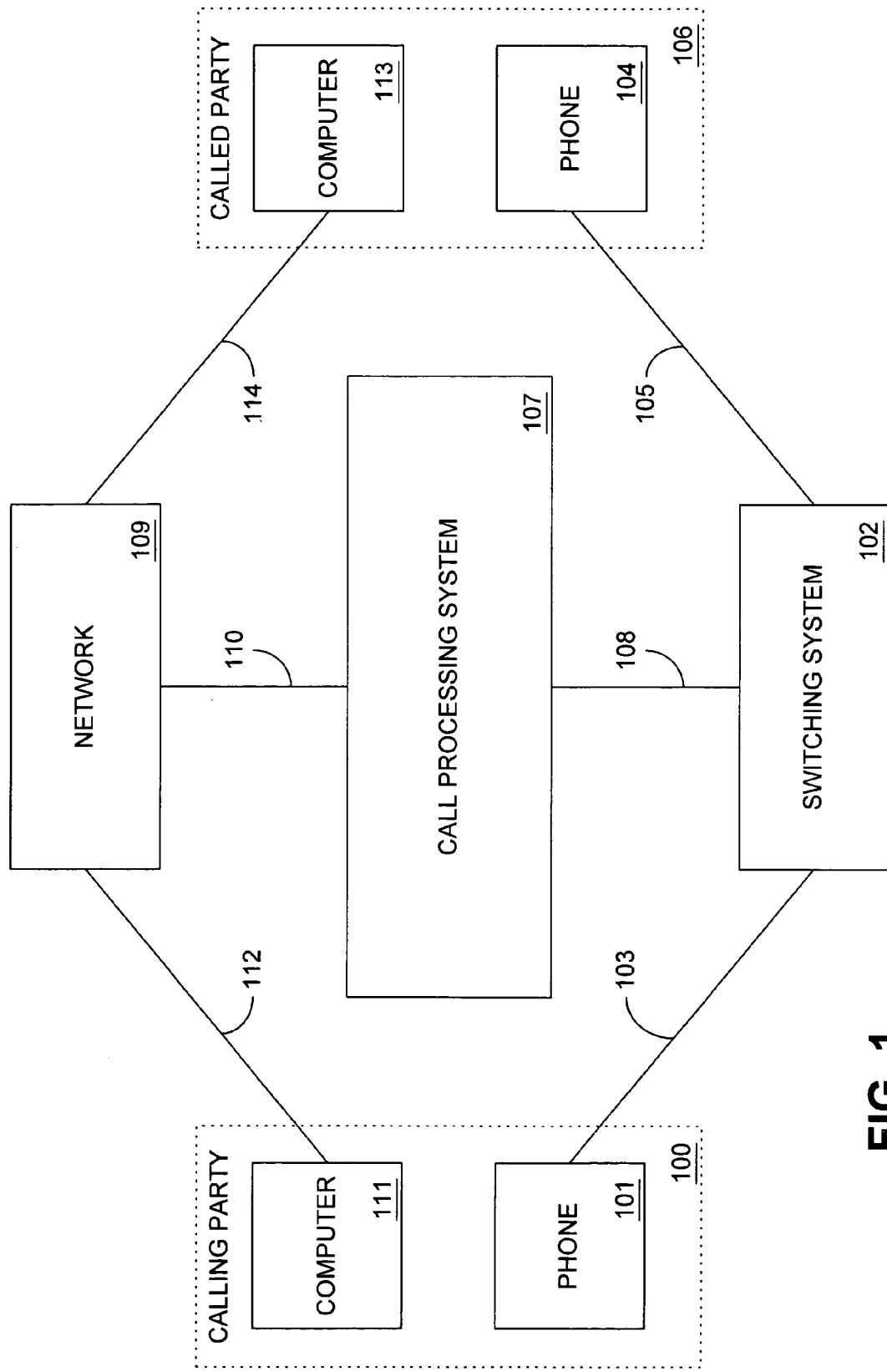
FIG. 1 is a block diagram illustrating a first embodiment, among others, of the present invention.

Referring now to FIG. 1, shown is a block diagram of one embodiment, among others, of the present invention. In this embodiment a calling party location 100 preferably includes a standard plain-old telephone system (POTS) telephone 101 operating substantially within the POTS frequency range. The POTS frequency range is typically defined as the frequency range of 0 to 4 kilohertz (kHz), which contains substantially the range of frequencies which are audible to the human ear. The phone 101 is typically connected to a switching system 102 by a connection 103. The switching system 102 routes calls placed by a calling party to a called party telephone 104, which is connected to the switching system 102 through a connection 105. The called party telephone 104 is a standard POTS telephone and resides at a called party location 106. The switching system 102 typically includes a network of switches which are connected to a call processing system 107 through a connection 108. During operation the switching system 102 receives call routing information which is stored on the call processing system 107. Further, the call processing system 107 can store any subscriber-specific information related to call handling. In other words, if the called party has subscribed to caller-identification (caller-ID), the call processing system 107 instructs the switching system 102 to include a caller-ID information packet with the incoming call indication (ring) sent to the called party telephone 104 on line 105. The incoming call indication typically includes an aural prompt such as ringing, however, it can include other sensory prompts, such as vibration, etc. A number of other services can be provided to subscribers, including some services which are provided to the calling party. A few of these include call-return, call-forwarding, call-waiting disabled, and caller-ID block, wherein the user presses a specific feature code (SFC) to activate the service.

Another service that can be provided to the calling party is an integrated chat client service, calling party choice, which is embodied by the present invention. Typically, when the calling party places a call, the switch associated with the calling party triggers a query, and will contact the call processing system 107 for handling instructions. Furthermore, if an SFC is dialed by the user, the switching system 102 will fire an SFC trigger and include the SFC in the query to the call processing system. Specific feature code describes the digits dialed by a user in order to initiate a specific feature on a call. For example, when a user wants to disable call-waiting, the specific feature code is "*70." Thus, the user will need to dial "*70" before dialing the telephone number in order to initiate the disable call-waiting feature.

When the calling party has subscribed to the integrated chat client service, the calling party can dial the specific feature code followed by the called party number to initiate the integrated chat client service. The switching system 102 would receive the specific feature code and fire a specific feature code trigger and query the call processing system 107. The call processing system 107 would receive the SFC trigger query and contact the network 109 through link 110 to search for network computer chat client accessibility of a called party chat client on computer 113. Specifically, the call processing system 107 searches for the accessibility of a called party chat client on computer 113 connected to the network by link 114. If the chat client on called party computer 113 is not accessible, the call processing system 107 instructs the switching system 102 to attempt to connect the call.

If the called party chat client on computer 113 is accessible, the call processing system 107 can send a prompt from an interactive voice response (IVR) system to the calling party telephone 101. The prompt notifies the calling party that the called party chat client on computer 113 is accessible and that a chat invitation has been sent to the called party. Alternatively, a prompt could be sent to the calling party phone 101 telling the calling party that the called party chat client on computer 113 is accessible, and confirming that the calling party would like to send a chat invitation to the called party chat client on computer 113. In which case, if the called party chooses to talk, an attempt to connect the voice call is made by the switching system 102 using instructions from the call processing system 107.

However, if the called party chooses to chat, the call processing system 107 retrieves the network addresses of the called party chat client on computer 113 and calling party chat client on computer 111. The call processing system 107 then sends a chat invitation to the network address corresponding to the called party chat client on computer 113 from the network address corresponding to a calling party chat client on computer 113. The voice call may then be terminated, or alternatively, the call processing system 107 may send the calling party telephone 101 notification the invitation sent to the called party computer 113.

In alternative embodiments, among others, the switching system 102 may send a query to the call processing system 107 when a busy signal is detected, or when there is no answer. When a busy signal or no answer is detected and the calling party subscribes to the integrated chat client, the call processing system 107 can check the accessibility of both the calling party chat client on computer 111 and called party chat client on computer 113, even without receiving the specific feature code from the calling party telephone 101. If both the calling party chat client on computer 113 and called party chat client on computer 111 are accessible, the call processing system 107 can send the calling party phone 101 an IVR prompt. The prompt will notify the calling party that the called party chat client on computer 113 is accessible and ask the calling party if they would like to initiate a chat session with the called party.

If the calling party declines the initiation of a chat session the call processing system 107 could send a busy signal to the calling party. Alternatively, the call processing system 107 could send other prompts depending upon the services that either of the called and calling parties subscribe to. For example, if the called party subscribes to voice mail, the call processing system 107 could prompt the calling party to leave a voice mail. In another example, the calling party may be prompted by the call processing system 107 to subscribe to a callback mechanism, whereby the call processing system 107 monitors the called party line and notifies the calling party when the called party telephone 104 is not busy.

On the other hand, if the calling party elects to chat with the called party the call processing system 107 would retrieve the network addresses of both the calling party chat client on computer 111 and the called party chat client on computer 113. The call processing system 107 would then send an invitation to the network address associated with the called party chat client on computer 113, from the network address of the calling party chat client on computer 111. The call processing system 107 may then notify the calling party phone 101 of the invitation being sent and drop the call. Upon responding affirmatively to the invitation, a chat session will be started between the calling and called parties. Alternatively, the call processing system 107 could keep control of the call. In this way, if the called party declines the chat session, the call processing system 107 could provide further options based on the services to which either party subscribes.

If a no answer trigger is detected by the switching system 102, the switching system would send a query to the call processing system 107. The call processing system 107 then retrieves the calling party profile, and, if the calling party subscribes to the integrated chat client service, the call processing system 107 checks the accessibility of the calling party chat client on computer 111 and the called party chat client on computer 113. If both computers 111, 113 are accessible, the call processing system 107 can send a prompt to the calling party telephone 101. The prompt could notify the calling party that the called party computer 113 is accessible and ask the calling party if they would like to chat with the called party.

If the calling party declines the initiation of a chat session the call processing system 107 could drop the call. Alternatively, the call processing system 107 could send other prompts depending upon the services to which either of the called and calling parties subscribe, as described above. On the other hand, if the calling party elects to chat with the called party the call processing system 107 would retrieve the network addresses of both the calling party computer 111 and the called party computer 113. The call processing system 107 would then send an invitation to the network address associated with the called party computer 111, from the network address of the calling party computer 111. The call processing system 107 may then notify the calling party phone 101 of the invitation being sent and drop the call. Alternatively, the call processing system 107 could keep control of the call. In this way, if the called party declines the chat session, the call processing system 107 could provide further options based on the services to which each party subscribes. Upon responding affirmatively to the invitation, a chat session will be started between the calling and called parties.

Furthermore, one skilled in the art will immediately recognize an abundance of chat clients presently available that may be used in conjunction with the present invention. Some of the more popular of these chat clients include: MSN Messenger, available from Microsoft, Corp. of Redmond, Wash.; Yahoo! Messenger, available from Yahoo!, Inc. of Sunnyvale, Calif.; AOL Instant Messenger, available from America Online, Inc. of Dulles, Va.; and Jabber Instant Messenger, available from Jabber, Inc. of Denver, Colo. One skilled in the art will further recognize that the Jabber Instant Messenger comprises an open systems architecture. Open systems architectures generally allow a user to manipulate the source program to tailor the client to specific needs of each individual user. Used in this context, the open system architecture could facilitate the development of a custom application to be provided with the integrated chat client. One skilled in the art will further recognize the existence of UNIX and LINUX chat programs and other programs, such as text messaging on wireless phones, that allow text communication between two parties. In alternative embodiments, each of these alternative text communication applications are intended to be included within the scope of the present invention. Generally, as understood herein, chat clients at least provide some type of text based communication, in accordance with the preferred embodiments of the invention.

It should be further recognized that, presently, there is no interoperability of chat services. Each uses a different server and a different database to connect the plurality of users that use a particular chat client. It can be compared to a situation whereby customers of one phone company would be prevented from calling customers of another phone company. This could pose a problem, generally referred to as the network effect, to widespread acceptance of the integrated chat client service. The network effect refers to the situation whereby a service becomes more valuable to a consumer when more consumers subscribe to the same service, thereby forming a network. In the instant messaging situation, the chat service providers offering the most users is the most valuable chat service. However, several chat service providers have large subscriber databases, making each of them fairly valuable, independent of the others.

The most straightforward solution to the network effect is to create interoperability between the numerous different chat services that exist. There is a push within the internet community to create a universal chat program and/or sharing of subscriber databases, along with several proposals to create interoperability among chat clients. However, there remains no industry consensus, and it is uncertain when, or if, there will be interoperability among chat clients.

Another solution to the problem could be for the telephone service provider to provide a custom application to all of its subscribers. In this way, the telephone service provider can create an instant network of users. However, the telephone service provider would still have to compete with the other chat service providers. Moreover, a calling party could be inaccessible to the telephone service provider network, even though it may have an accessible chat client installed. The advantage to this solution is that the telephone service provider will have direct access to the chat server, which would likely be faster than requesting the chat information from a third party.

Yet another solution to the network effect could be to form alliances between the telephone service provider and chat service providers. This solution is similar to the interoperability solution, however, it involves agreement between the telephone service provider and the chat service provider, rather than among competing chat service providers. For this solution, the telephone service provider could merely have access to query the chat server and request chat invitations be sent to accessible chat clients.

A further alternative embodiment, among others, of the present invention includes checking a network database to ascertain the accessibility of the calling party chat client on computer 111 or the called party chat client on computer 113. This database could contain a number of different fields regarding customizable options. One such field could comprise a list of customers that have a chat client registered with the database on the network. This field would be similar to the so-called "buddy list" commonly used on many instant messaging clients. When a user opened a chat client and entered his/her user identification (handle) and password, the chat client would automatically record that handle as present with the accessibility database.

Another useful field for the network database could be an availability field. The availability field could be a field similar to a sleep mode on a computer. When a user has not accessed the chat client for a pre-determined amount of time, or has told the chat client that he/she will be away from the computer, the chat client will still show the chat client as present, however, the chat client will be listed as unavailable, and hence inaccessible.

The network database could also keep track of a preference field. These preferences could be set by the users regarding their instant messaging clients. For example, one user might prefer to get invitations to chat, while another may not want to be bothered with chat invitations at the present time. These chat clients which prefer not to be bothered with chat invitations would be listed as inaccessible. Furthermore, the calling or called party may not want to receive an IVR, or invitation, every time an accessible chat client is present. In this case, the calling and called parties can set the accessibility field to show their chat client is inaccessible, and the call processing system 107 considers the called party accessibility during operation.

Figure 2A:
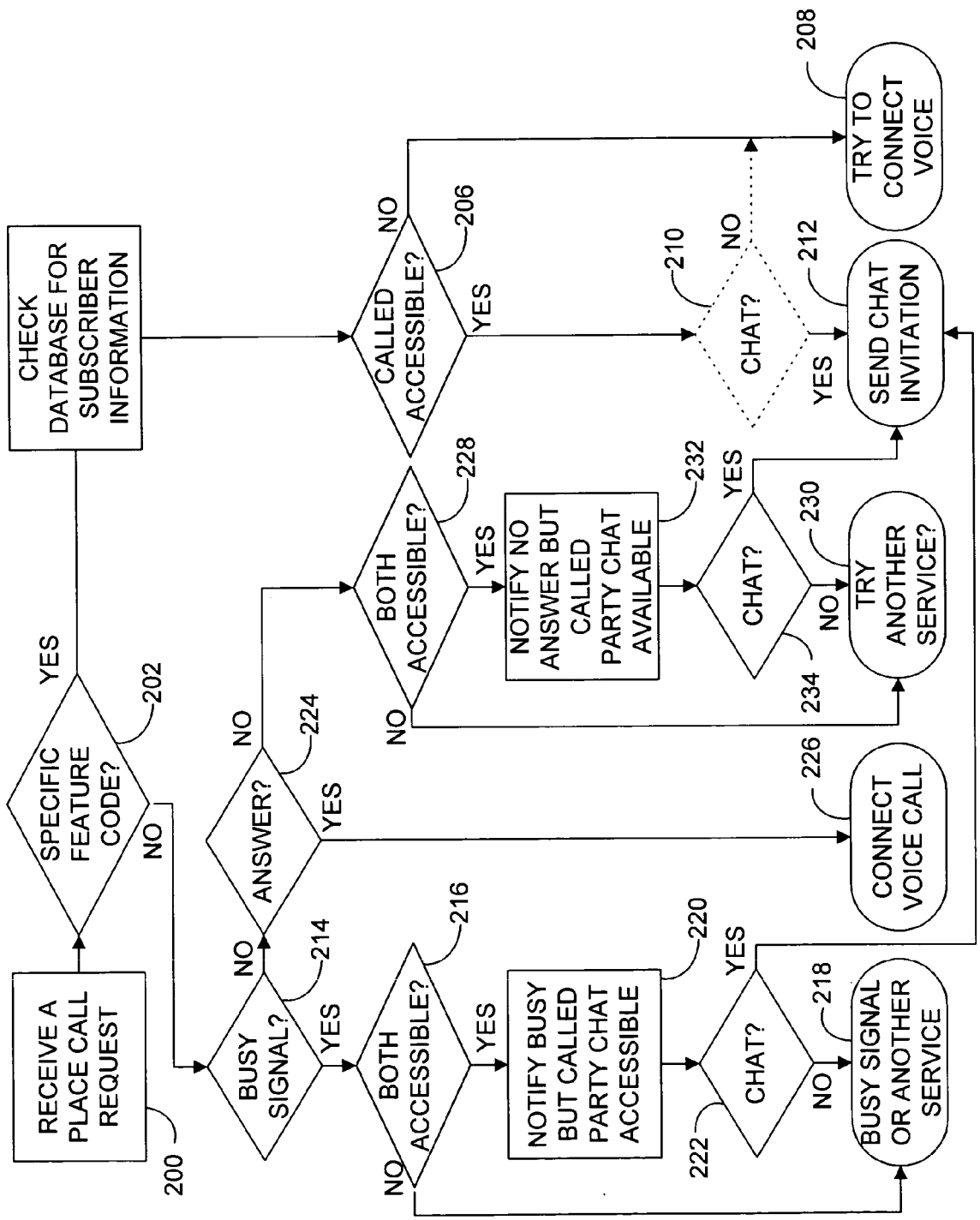
FIG. 2A is a flowchart showing the operation of the first embodiment, among others, of the present invention.

Referring now to FIG. 2A, shown is a flowchart illustrating the operation of one embodiment, among others, of the present invention. In block 200 a place call request is received at the switching system 102. The place call request may or may not be accompanied by a specific feature code, as illustrated by block 202. As shown by block 204, if the place call request contains a specific feature code, the call processing system 107 checks the database for subscriber information on the called party. After finding the called party information, the call processing system 107 determines whether the called party has an accessible chat client, shown by block 206. If the party does not have an accessible chat client, a voice call connection is attempted, as shown by block 208. However, if the called party does have and accessible chat client, the call processing system 107 may confirm the calling party would like to chat with the called party, shown by block 210. If the confirmation fails, a voice call connection is attempted, as shown by block 208. However, if the chat is confirmed a chat invitation is sent to the called party chat client from the calling party chat client, as shown by block 212.

If the calling party has not entered a specific feature code when dialing the number, the calling party may, in accordance with the present invention, still have the option of attempting to begin a chat session with the called party. The first instance where this option could become available is upon receipt of a busy signal from the called party telephone 104, shown by block 214. If a busy signal is received, the call processing system 107 first accesses the network 109 to search for accessible chat clients associated with the called and calling party computers 113, 111, as shown by block 216. If one of the parties is inaccessible, the call processing system 107 sends a busy signal to the calling party telephone 101, as shown by block 218, or prompts the user depending upon which other services the calling and called parties subscribe to.

If both called and calling party computers 113, 111 are available, the call processing system 107 notifies the calling party that the line is busy, but that the called party has a chat client that is accessible, as shown by block 220. The call processing system 107 then prompts the calling party, asking the calling party if they would like to chat with the called party instead, as shown by block 222. If the party does not wish to chat, as shown by block 218, the call processing system 107 sends the calling party telephone 101 a busy signal or prompts the user depending upon which other services the calling party and/or called party subscribes to. If the party chooses to chat, the call processing system 107 sends a chat invitation to the called party chat client on behalf of the calling party chat client, as shown by block 212.

If there is no busy signal, the system waits for the called party to answer, as shown by block 224. If there is an answer, a voice call is connected, as shown by block 226. However, if there is no answer, the call processing system 107 could check whether both the calling party chat client and the called party chat client are accessible, as shown by block 228. If either party is inaccessible, the call processing system 107 could prompt the calling party to use another service, such as voice mail, shown by block 230.

If both the calling party chat client and the called party chat client are accessible, then the call processing system 107 could notify the calling party that it has received no answer, but the called party has a chat session running, as shown by block 232. The call processing system could then prompt the calling party, asking whether or not the calling party would like to chat with the called party, as shown by block 234. If the calling party does not want to chat with the calling party, the call processing system 107 could offer the calling party some other service, as shown by block 230. However, if the calling party wishes to chat, the call processing system 107 would send a chat invitation to the called party chat client on behalf of the calling party chat client.

Figure 2B:
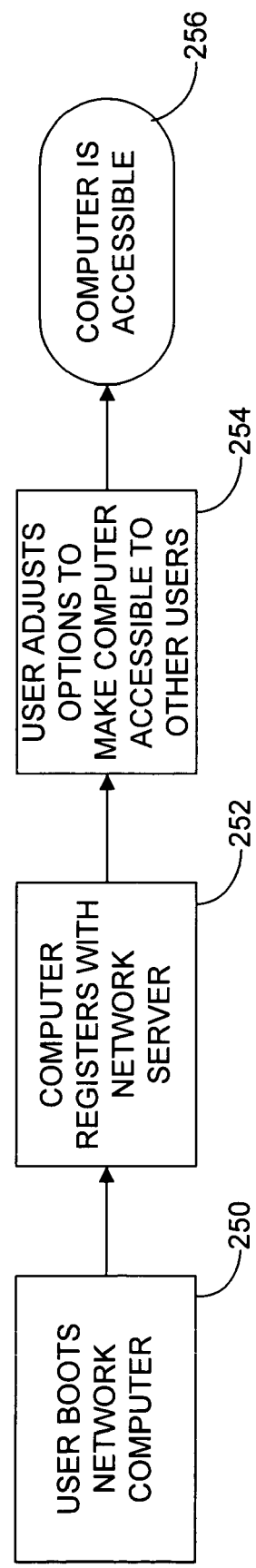
FIG. 2B is a flowchart showing the operation by which a computer is made accessible with respect to FIG. 2A.

Referring now to FIG. 2B, shown is a flowchart illustrating an example method by which a computer (either the calling party or called party computer) is made accessible to the integrated chat client service. In general, it would be preferable if all computers operated according to the method of FIG. 2B, however, the method could work even if only a handful of network computers operated according to the method of FIG. 2B. As shown in block 250, the user first boots the network computer. Then in block 252, the network computer registers with a network server. Typically a computer registers with the network either during the startup process, or when the user decides to use the internet. Then, as shown in block 254, the user can adjust a number of options to make the computer accessible to other users for chat session invitations.

Some of these options can be automated, while others may require user input to change. A few such options, among a plurality of others, could be: presence, wherein the computer is either registered or not registered with the server; preference, wherein the user has requested not to be available for chat sessions; and availability, wherein the user has left his/her chat client inactive for a period of time, or has indicated to the network computer that he/she will be unavailable. One skilled in the art will recognize numerous other accessibility options that can be configured to provide a user with enough flexibility for virtually any situation.

Figure 3:
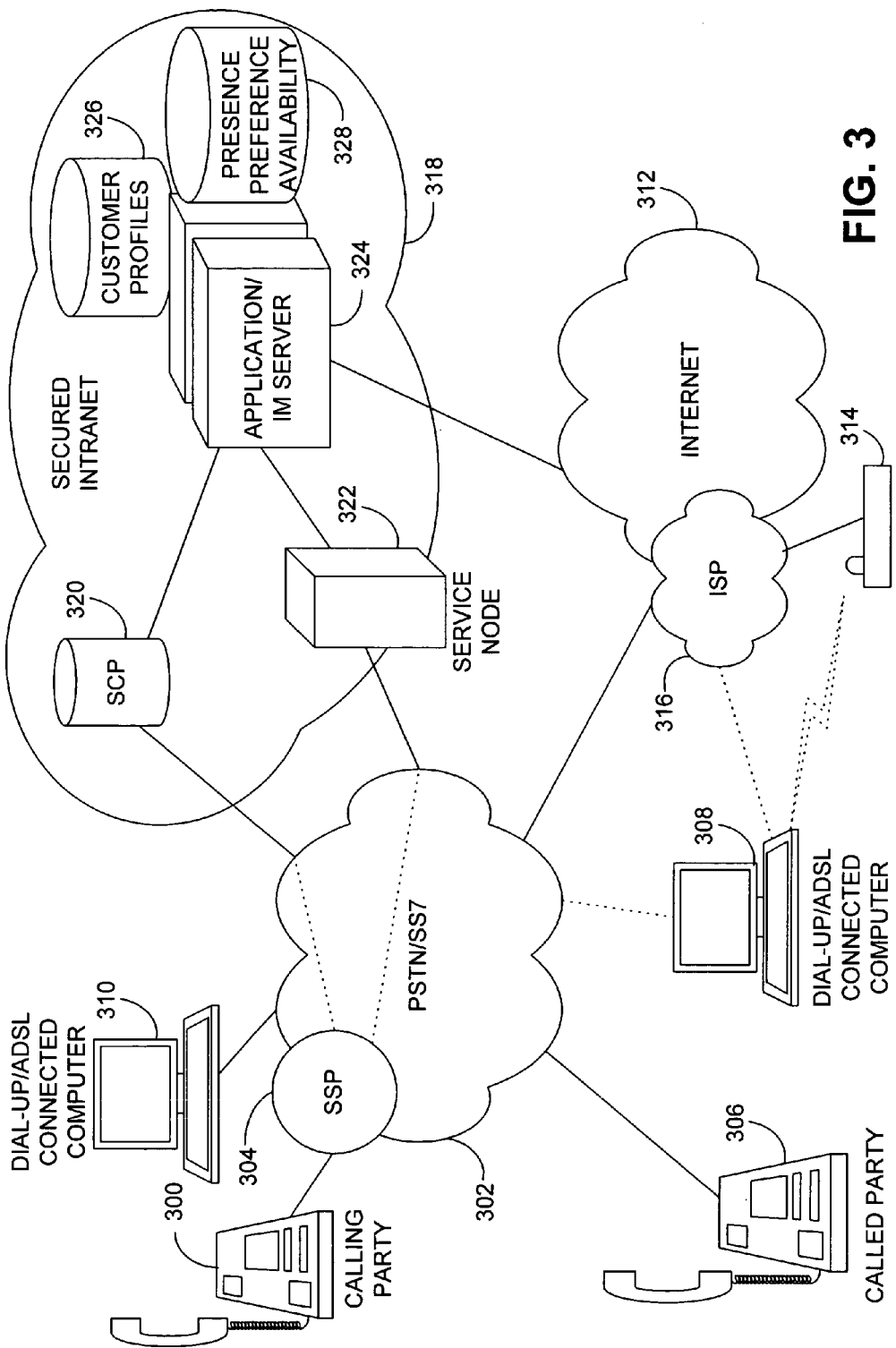
FIG. 3 is a schematic diagram illustrating a second embodiment, among others, of the present invention.

Referring now to FIG. 3, shown is a schematic diagram of one example system, among others, made according to FIG. 1. As is shown, a calling party telephone 300 is connected to a PSTN/SS7 protocol network 302. The SS7 protocol network includes a plurality of service switching points 304, which in turn are connected to a plurality of telephones, including the called party telephone 306. The called and calling parties have associated computers 308, 310, respectively. Each of these computers can be connected to the internet 312. As is known to those skilled in the art, internet connections can come in a variety of different forms. A few such forms include: a wireless local area network connection 314, through an internet service provider (ISP) 316; a direct connection to the ISP 316; a dial-up modem through the PSTN 302; a digital subscriber line through the PSTN 302; and a cable modem (not shown). Although the calling party computer 310 is shown connected to the internet 312 through the PSTN 302, the calling party computer 310 may be connected with any of the methods enumerated above, or any other method for connecting to the internet 312.

The PSTN/SS7 protocol network is further connected to a secured intranet 318, controlled by the telephone service provider, for example. The secured intranet 318 includes a service control point 320, a service node 322, both of which are coupled to an application server 324, containing a customer profile database 326 and a presence, preference and availability database 328.

One skilled in the art will recognize that each telephone service provider has a slightly different implementation of the AIN system, and often component names differ some between these implementations. Each of these alternative implementations of the AIN system is intended to be included within the scope of the present invention. Furthermore, the fact that the AIN and SS7 protocol are used in exemplary embodiments of the present invention is not intended to limit the present invention to these particular implementations of intelligent networks (INs). Any IN or phone network with the ability to deliver customized phone service has the potential ability to advantageously utilize the present invention.

Figure 4:
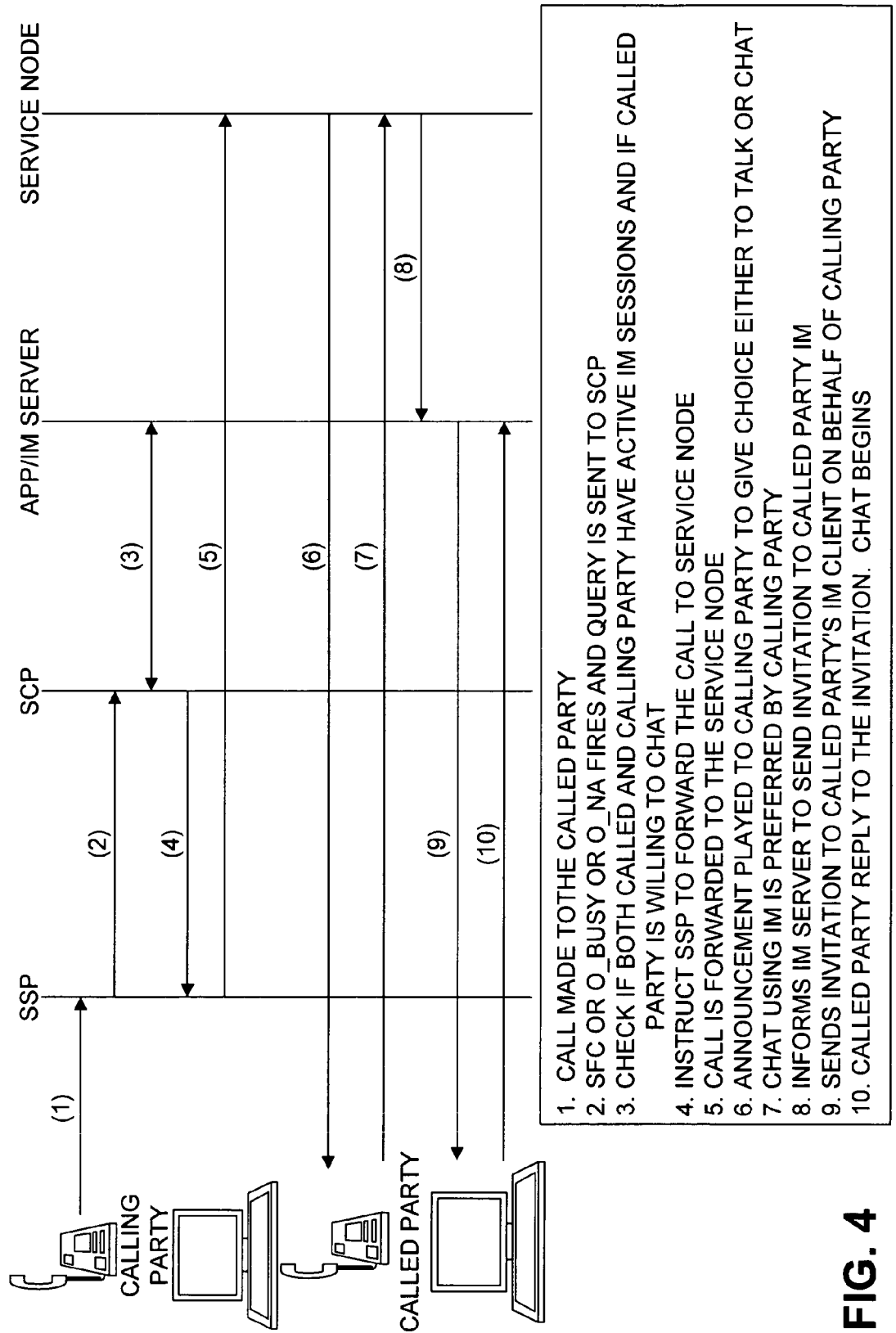
FIG. 4 is a call flow diagram detailing the operation of the second embodiment, among others, shown in FIG. 2.

Referring now to FIG. 4, shown is a call flow diagram illustrating the operation of one embodiment of the invention, among others, shown in FIG. 3. As one skilled in the art will recognize the system involves making the calling and called party computers 300, 306 accessible to chat prior to placing a telephone call. First a calling party places a call to the called party.

When the call is received at the calling party SSP 304, a specific feature code (SFC), originating busy (O_Busy), or an originating no answer (O_NA) trigger fires. The trigger then causes the SSP 304 to send a query to the SCP 320. The SCP 320 generally contains a database of subscriber-specific profiles and call routing information. When the SCP 320 receives the query from the SSP 320, the SCP 320 searches the database for a subscriber-specific profile. The subscriber-specific profile, for this example, can include the integrated chat client service. If the subscriber-specific profile does not contain the integrated chat client service, the SCP 320 will typically receive the SFC before launching the integrated chat client service.

In this embodiment, the SCP 320 then instructs an application/chat server 324 to search its database 328 to check if the called and calling parties have active chat sessions and to see if the called party chat session is set up to accept chat invitations. If both parties have active chat sessions and are accepting chat invitations, the SCP 320 instructs the SSP 304 to forward the call request to the service node 322.

The SSP 304 then forwards the call to the service node 322, which can use an IVR to prompt the calling party with an option to chat with the called party. One skilled in the art will recognize that the service node may further include caller identification information to facilitate the choice of whether to chat or to talk. When the called party does not wish to chat, a voice call connection is attempted. However, when the called party chooses to chat, the service node 322 then instructs the application/chat server 324 to send a chat invitation to the called party on behalf of the calling party. The application server 324 then sends a greeting to the called party on behalf of the calling party. When the called party responds affirmatively to the invitation and the chat session begins.

Figure 5A:
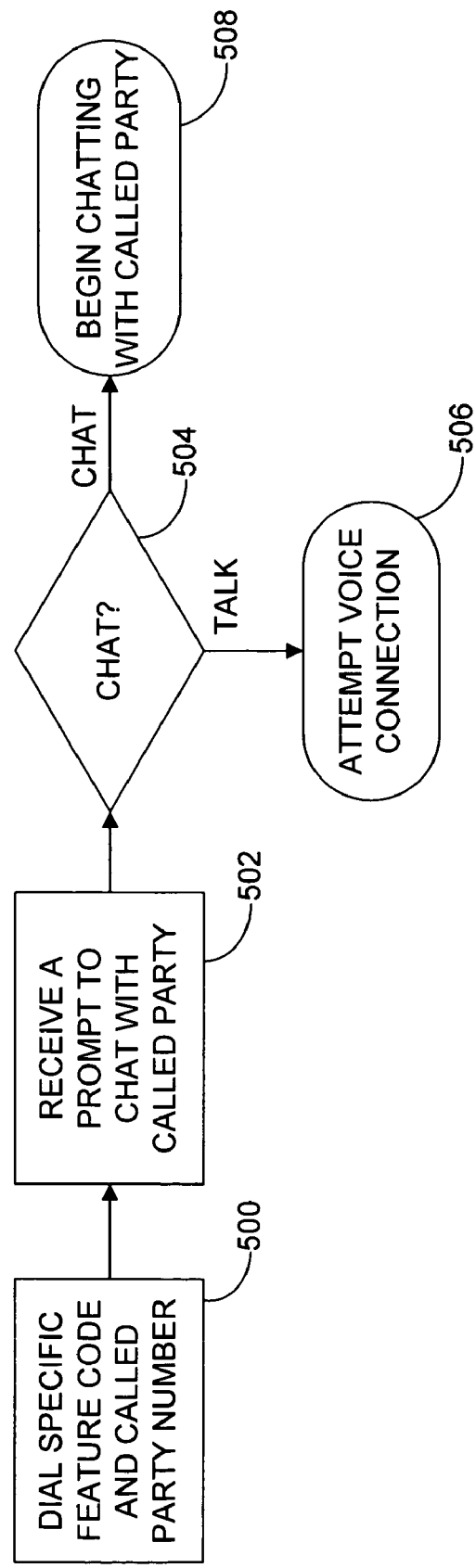
FIG. 5A is a flowchart illustrating a method, among others, of using the integrated chat client shown in FIG. 1.

Referring now to FIG. 5A, shown is a flowchart illustrating an example method for placing a telephone call using the integrated chat client service. In accordance with the first block 500, the calling party dials a specific feature code along with the called party telephone number. Then, as shown by block 502, the calling party is prompted to chat with the called party. The calling party then makes a choice to chat or talk to the called party, as shown by block 504. If the calling party chooses to talk with the called party, a voice call connection is attempted, as shown by block 506. On the other hand, if the calling party chooses to chat with the called party, the calling party waits for the called party to accept the chat and begins chatting, as shown by block 508.

Referring now to FIG. 5B, shown is a flowchart illustrating a method for placing a telephone call using the integrated chat client service. In accordance with the first block 510, the calling party dials the called party telephone number. Then, as shown by block 512, the calling party receives notification that the called party telephone is busy, but that chat is available. The calling party then makes a choice of whether or not to chat with the called party, as shown by block 514. If the calling party chooses not to chat with the called party, another service can be tried, or the call may be discontinued, as shown by block 516. On the other hand, if the calling party chooses to chat with the called party, the calling party waits for the called party to accept the chat and begins chatting, as shown by block 518.

Referring now to FIG. 5C, shown is a flowchart illustrating a method for placing a telephone call using the integrated chat client service. In accordance with the first block 520, the calling party dials the called party telephone number. Then, as shown by block 522, the calling party receives notification that the called party telephone is not answering, but that chat is available. The calling party then makes a choice of whether to chat with the called party, as shown by block 524. If the calling party chooses not to chat with the called party, another service can be tried, or the call may be discontinued, as shown by block 526. On the other hand, if the calling party chooses to chat with the called party, the calling party waits for the called party to accept the chat and begins chatting, as shown by block 528.

The systems described herein would allow a calling party to check the status of the called party with respect to a chat session. One advantage such a system could provide is the ability to free up a phone line for important incoming calls. A further advantage would be that if the calling party is dialing a long distance number, the calling party can avoid the long distance charges implicated by such a call by merely chatting with the called party rather than paying per minute long distance usage charges.

The systems described herein would further provide the user with the flexibility to communicate with a calling party without making his/her side of the conversation available to others in the area. For example such communication could be invaluable to an employee who is looking for a new job and would like to keep it secret from his/her supervisor and co-workers. Another situation in which such a system would be useful may occur during the purchase of a new home, when calls to a lender from the workplace of the buyer may be necessary, and sensitive information such as salary and/or net worth must be made available. Most often, employees do not want to share this sort of information with his/her co-workers.

Process and function descriptions and blocks in flow charts can be understood as representing, in some embodiments, modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. In addition, such functional elements can be implemented as logic embodied in hardware, software, firmware, or a combination thereof, among others. In some embodiments involving software implementations, such software comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, propagate, or transport the software for use by or in connection with the instruction execution system, apparatus, or device.

It should be emphasized that the above-described embodiments of the present invention are merely possible examples of implementations set forth for a clear understanding of the principles of the invention. Many variations and modifications may be made to the above-described embodiment(s) of the invention without departing substantially from the principles of the invention. All such modifications and variations are intended to be included herein within the scope of this disclosure and the present invention and protected by the following claims.

What is claimed is:

1. A method for converting a voice call attempt to an alternate medium for a real-time communication session, comprising:
   receiving a telephone call request;
   checking for accessibility of a called party chat client associated with a called party; and
   prompting a calling party to choose whether or not to electronically chat with the called party in an electronic chat session when the called party chat client is accessible, wherein the electronic chat session is enabled between a calling party chat client and the called party chat client that are logged into respective electronic chat servers.

2. The method of claim 1, further comprising:
   sending an invitation to the called party, inviting initiation of a chat session with the calling party when the calling party chooses to chat.

3. The method of claim 2, further comprising:
   connecting a voice call when the calling party chooses not to chat.

4. The method of claim 1, wherein the method further comprises:
   checking for accessibility of a calling party chat client associated with the calling party.

5. The method of claim 1, further comprising:
   starting a query upon receiving a prefix code, a busy trigger or a no answer trigger.

6. The method of claim 5, wherein the method further comprises:
   forwarding the call request to prompt the calling party when the called party chat client is accessible.

7. The method of claim 6, further comprising:
   updating a first database, the first database comprising information used to connect a plurality of chat clients.

8. The method of claim 7, further comprising:
   using the first database to connect the chat session when the called party chooses to chat.

9. The method of claim 1, wherein checking for accessibility comprises:
   updating a second database, the second database comprising information about which of a plurality chat clients are registered with a respective chat server; and
   searching a second database for registration of the called party chat client.

10. The method of claim 9, wherein the second database further comprises information about which of the plurality of chat clients registered are present at a computer to chat, and checking for accessibility further comprises:
    searching the second database for presence of the called party chat client.

11. The method of claim 10, wherein the second database further comprises information about which of the plurality of chat clients registered with the respective chat server have a preference to chat, and checking for accessibility further comprises:
    searching the second database for the preference of a called party chat client.

12. The method of claim 1, further comprising:
    providing a first internet service provider coupled to a calling party terminal associated with the calling party.

13. The method of claim 1, further comprising:
    providing a second internet service provider coupled to a called party terminal associated with the called party.

14. The method of claim 1, wherein the chat session is initiated over an instant messaging client.

15. A method for converting a voice call attempt to an alternate medium for a real-time communication session, comprising:
    dialing, via a first communications device, a prefix code;
    dialing, via the first communications device, a called party telephone number associated with a called party;
    selecting to electronically chat with the called party when a called party chat client is accessible; and
    initiating an electronic chat session between a second communications device and the called party chat client when the calling party selects to electronically chat.

16. The method of claim 15, further comprising:
    connecting a voice call when the called party chat client is inaccessible.

17. The method of claim 15, wherein accessibility of a plurality of chat clients, including the called party chat client, is defined in relation to a database comprising registration, presence at the called party chat client, and preference for a chat session fields.

18. The method of claim 17, wherein the accessibility of the called party chat client is operable to be updated by the called party through the internet.

19. The method of claim 18, wherein the accessibility of the called party chat client is updated by the called party through a chat server, the chat server being coupled to a called party terminal and the database.

20. The method of claim 17, further comprising:
    updating accessibility in the database upon receipt of a request by a party with whom a chat client is associated.

21. A method for converting a voice call attempt to an alternate medium for a real-time communication session, comprising:

dialing a called party telephone number associated with a called party;
receiving a prompt indicating the called party telephone number is busy, and a called party chat client is accessible;
selecting to electronically chat with the called party when a called party chat client is accessible; and
initiating an electronic chat session between a calling party chat client and the called party chat client when the calling party selects to electronically chat, wherein the calling party chat client and the called party chat client are logged into respective chat servers before initiation of the electronic chat session.

22. The method of claim 21, further comprising:
receiving an alternate subscriber service when the called party chat client is inaccessible.

23. The method of claim 21, wherein accessibility of a plurality of chat clients, including the called party chat client, is defined in relation to a database comprising registration, presence at the called party chat client, and preference for a chat session fields.

24. The method of claim 23, wherein the accessibility of the called party chat client is operable to be updated by the called party through the internet.

25. The method of claim 24, wherein the accessibility of the called party chat client is updated by the called party through a chat server, the chat server being coupled to a called party terminal and the database.

26. The method of claim 23, further comprising:
updating accessibility in the database upon receipt of a request by a party with whom a chat client is associated.

27. A method for converting a voice call attempt to an alternate medium for a real-time communication session comprising:
dialing a called party telephone number associated with a called party;
receiving a prompt indicating no answer at the called party telephone number, and a called party chat client is accessible;
selecting to electronically chat with the called party when a called party electronic chat client is accessible; and
initiating an electronic chat session between a calling party electronic chat client and the called party electronic chat client when the calling party selects to electronically chat.

28. The method of claim 27, further comprising:
receiving an alternate subscriber service when the called party electronic chat client is inaccessible.

29. The method of claim 27, wherein accessibility of a plurality of electronic chat clients, including the called party electronic chat client, is defined in relation to a database comprising registration, presence at the called party electronic chat client, and preference for a chat session fields.

30. The method of claim 29, wherein the accessibility of the called party electronic chat client is operable to be updated by the called party through the internet.

31. The method of claim 30, wherein the accessibility of the called party electronic chat client is updated by the called party through an electronic chat server, the electronic chat server being coupled to a called party terminal and the database.

32. The method of claim 31, further comprising:
updating accessibility in the database upon receipt of a request by a party with whom an electronic chat client is associated.

33. A computer-readable medium having a program for converting a voice call attempt to an alternate medium for a real-time communication session, the program performing the steps of:
receiving a telephone call request;
checking for accessibility of a called party electronic chat client associated with a called party; and
prompting a calling party to choose whether or not to electronically chat with the called party when the called party electronic chat client is accessible, wherein electronic chat communication is enabled between a calling party electronic chat client and the called party electronic chat client.

34. The medium of claim 33, further comprising the step of:
sending an invitation to the called party, inviting initiation of an electronic chat session with the calling party when the calling party chooses to electronically chat.

35. The medium of claim 34, further comprising the step of:
connecting a voice call when the calling party chooses not to electronically chat.

36. The medium of claim 33, wherein the program further comprises the step of:
checking for accessibility of a calling party electronic chat client associated with the calling party.

37. The medium of claim 33, further comprising the step of:
starting a query upon receiving a prefix code, a busy trigger or a no answer trigger.

38. The medium of claim 37, wherein the program further comprises the steps of:
forwarding the call request to prompt the calling party when the called party electronic chat client is accessible.

39. The medium of claim 33, the program further comprising the steps of:
updating a first database, the first database comprising information used to connect a plurality of electronic chat clients; and
using the first database to connect the electronic chat session when the called party chooses to electronically chat.

40. The medium of claim 33, wherein the checking for accessibility step comprises:
updating a second database, the second database comprising information about which of a plurality of electronic chat clients are registered with an electronic chat server;
searching a second database for registration of the called party electronic chat client; and
searching the second database for presence of the called party electronic chat client, wherein the second database further comprises information about which of the plurality of electronic chat clients registered are present at a computer to electronically chat.

41. The medium of claim 40, wherein the second database further comprises information about which of the plurality of chat clients registered with the electronic chat server have a preference to electronically chat, and the checking for accessibility step further comprises searching the second database for the preference of a called party electronic chat client.

42. A computer-readable medium having a program for converting a voice call attempt to an alternate medium for a real-time communication session, the program performing the steps of:

detecting an incoming voice call attempt for initiating a voice session;

identifying availability of a called party of the voice call on an alternate communications medium; and initiating an alternative real-time communication session in lieu of the voice session when the called party is available on the alternative communication medium.

43. The medium of claim 42, wherein the alternative real-time communication session is an electronic chat session and the electronic chat session is enabled between a calling party electronic chat client and a called party electronic chat client.

44. The medium of claim 42, wherein the alternative real-time communication session is a different type of communication session than the voice session.

45. The medium of claim 42, wherein the availability of the called party is determined partially on whether the called party has designated a preference for initiating an alternative real-time communication session from an incoming voice call.

46. The medium of claim 42, wherein the availability of the called party is determined based on whether the called party has an active electronic chat session.

47. The medium of claim 42, the program further performing the step of:

sending an invitation to the called party on behalf of the calling party to invite the called party to communicate via an alternate real-time communication session.

48. The medium of claim 47, wherein the initiating step is performed when the calling party responds to the invitation by selecting to communicate via the alternate real-time communication session.

49. The medium of claim 48, wherein a voice call from the calling party is terminated after the calling party selects to communicate via the alternative real-time communication session.

50. The medium of claim 47, further comprising the step of:

establishing a voice session in lieu of initiating an alternative real-time communication session when the calling party responds to the invitation by selecting to participate in a voice session.

51. The medium of claim 47, wherein a connection to an incoming voice call is maintained until the called party responds to the invitation and selects to communicate via the alternative real-time communication session.

* * * * *